Sept. 19, 1961     F. B. SHAW, JR., ET AL     3,000,775
SHEATHED POLYESTER LAMINATES
Filed Nov. 21, 1956
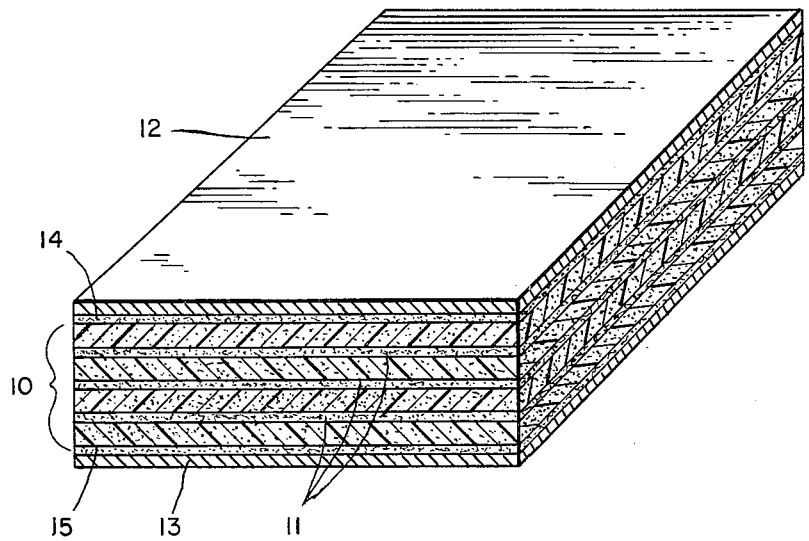
INVENTORS
FRED B. SHAW, JR.
and JOHN B. MERRIAM
BY Mason, Porter, Difler & Stewart,
ATTORNEYS

3,000,775
SHEATHED POLYESTER LAMINATES
Fred B. Shaw, Jr., Milwaukee, and John B. Merriam, Menomonee Falls, Wis., assignors to Continental Can Company, Inc., New York, N.Y., a corporation of New York
Filed Nov. 21, 1956, Ser. No. 623,578
5 Claims. (Cl. 154—139)

This invention relates to the preparation of laminated materials and articles in which a film of polyester material is secured on the surface of a body of polyester plastic.

Sheets and articles have been made from polyester resins, such as linear polymeric ethylene glycol terephthalate (one commercial form being known under the trademark MYLAR), which has thermoplastic properties. In preparing sheets of such linear polymer, difficulty is encountered, and presently sheet thickness is limited to 7½ mils and dimensional instability is frequently exhibited upon heating: it provides an excellent surfacing material, but is not readily brought to satisfactory adhesion to other materials. Bonds with elastomeric adhesives have been utilized for joining it to modified polyester materials which have been reinforced by glass fiber, for example: but the adhesion is largely by marginal bonds so that peeling and separation are commonly experienced.

In the practice of preparing laminated materials, the reinforcing webs are saturated with the resin, and then passed through combining rolls spaced at a specified distance so that the webs are brought to a fixed total thickness. Impervious films, for example of cellophane, are then applied to top and bottom of the group of laminations, preliminary to heating the laminated assembly for curing and joining. These films act to shield the resin from the air and thus prevent an inhibiting effect upon curing, by the action of oxygen; they also inhibit the flow of the resin in the saturated webs, and thus keep the product within the thickness range determined by the combining rolls; they provide layers of material which can be clamped at the edges in tenter frames of a conveyor for moving the assembly through the curing oven system: and finally the use of the surfacing webs permits selection of their surface finishes so that a mating surface effect is given to the cured laminated product. Such surfacing films have been non-heat sealing grades of cellophane, and have been satisfactory: they are available commercially but in limited ranges of width. After curing, they are stripped away and discarded.

When the linear polyester films, e.g. of ethylene glycol terephthalate, are used for protecting and surfacing such laminates prior to and during curing, difficulties are encountered. On the one hand, local adhesions are of such strength that the films cannot be stripped without damage, so that cost considerations prevent its use as a substitute for cellophane; and, on the other hand, the lack of satisfactory all-over adhesion does not permit its being left in place, without stripping. Surface-active agents, added to the polyester resins of the main body, do not permit effecting a more ready and satisfactory removal of the surfacing films. Such linear polymer films are obtainable commercially with surface decoration by adherent designs in inks: but it has been found that when used for surfacing of polyester cores of laminates, cleavage occurred, with parts of the pattern being transferred to the core by loosening of the bond thereof to the surface film itself. In the course of time, the bonding was found to improve: but for example after six months the adhesion is not considered satisfactory for commercial use of the composite.

According to the instant invention, a satisfactory and permanent bonding of linear polyester films, such as ethylene glycol terephthalate linear polymer, can be effected upon polyester body resins, whereby the costs of employment of surfacing films for later removal can be eliminated; and the advantages of polyester linear polymer surfaces attained upon the final product, particularly noting that such surfacing films can be obtained commercially in decorated forms; and that such decorating can be done before employment; for examples, upon the inner face of the linear polymer surfacing film with protection of the decoration by the surfacing film itself, or upon the material employed for the core material layer adjacent a transparent linear polymer surfacing film. Further, the adhesive itself may be colored before application to the linear polymer surfacing film, either as a single or "solid" decorative coating or by use of differentially colored and/or uncolored adhesive employed by printing or other application to produce a design or pattern effect.

This is attained by use of a composite bonding material which has excellent cohesion within itself after curing, and which establishes excellent adhesion bonds to the polyester core material and to the linear polymer surfacing material. Thereby a product is obtained which has the excellent wear resistance of the linear polymer but without the stiffness exhibited by laminate materials of like thickness and having traditional wear-resisting surfacing layers. For example, such traditional material with 0.002 to 0.003 inch surfacings of clear thermoset resin usually are limited to forming around a mandrel of one inch radius at 70 degrees F. and a mandrel of ¼ inch radius at 250 degrees F. without shattering of the clear resin layers: comparably a linear polymer surfaced material of the same over-all thickness, made as described herein, may be folded 180 degrees at 70 degrees F. without damage.

One such composition consists of a mixture of a liquid polyester resin, monomeric diallyl phthalate and polyvinyl butyral, in a volatile solvent for such components. This is applied as a solution to the inner surfaces of the surfacing films, the solvent evaporated, these inner surfaces then pressed smoothly against the core, and finally the assembly is subjected to the curing heat.

In general, liquid polyester resin, monomeric diallyl esters of dibasic organic acids, and polyvinyl acetals can be mixed in a wide variety of proportions, as a solution in a volatile solvent such as alcohol or ethylene dichloride, along with a catalyst such as benzoyl peroxide in about 2 percent by weight based upon the total content of polyester resin and diallyl phthalate.

The products are characterized by extremely firm adherence of the linear polymer surface film material to the polyester core, such that it is extremely difficult or impossible to remove the surfacing component without totally destroying the entire laminate.

These laminates, sheathed with linear polyester, can be prepared in a variety of ways. The bonding solution can be applied to a surface of the linear polymer, the solvent evaporated, and the sheet or strip rolled upon itself for storage. It can then be unwound for hand layup or continuous operations; and gives excellent results with either high pressure or merely contact pressure during the curing phase. In continuous production of laminate webs, a roll of uncoated linear polymer can be unrolled and passed through coating rolls so that the solution of bonding material is applied to one surface thereof: when the linear polymer is to be employed at both surfaces, the webs from two such rolls are each coated at one side. The webs are caused to travel through paths of sufficient length for evaporation of the volatile solvent, heat from heat lamps for example being useful in reducing the path length. The webs are then for example brought into assembly above and below a number of layers of reinforcing material such as paper, glass fiber, etc., each layer being saturated with a polyester compound of curable type: and the composite is passed through smooth rollers for compacting, sizing and surfacing the assembly, and thence through an oven for curing the core saturant and the bonding materials.

An illustrative sheet of laminate stock is shown on the accompanying drawing, in which the core or body 10 is made from three sheets of reinforcing material 11 which have been individually saturated with a body resin composition, then brought between the facing sheets 12, 13, and sized by passing between smooth surfaced rollers. Prior to the application of the surfacing sheets 12, 13, each of these has been provided at its inner surface with a layer 14 or 15 of the adhesion or bonding material as described herein. This assemblage is then advanced through the oven system and the curing of the "wet layup" laminate and adhesion material accomplished.

It has also been found possible to effect adhesion of the adhesive-coated linear polymer material to a fully cured polyester article, e.g. as made by curing inside a cellophane surfacing which has later been peeled away, by merely applying the adhesive coated or inner surface of the linear polymer material to the clean surface of the polyester article, and then exposing the assembly to temperatures in excess of 200 degrees F. At 200 degrees F., the curing requires about 45 minutes: this time factor can be readily reduced by the use of more elevated temperatures. Excellent adhesion to the pre-formed and pre-cured polyester core occurs, and the surfacing film is tightly retained.

The process yields satisfactory results upon all types of commercially available polyester resins, including those classed as rigid, flexible, and fire-resistant.

The solutions employed for brush or roller coating in usual equipment are preferably made at about 35 percent maximum solids content, to obtain a satisfactorily low viscosity and facilitate uniform coating upon the linear polymer film. Higher solids contents can be employed when the application techniques are appropriately modified; but in general it is preferred to have not over 50 percent solids present. The solvents are preferably those which are effective upon the components at the selected solids content, and with low boiling points and high vapor pressures at normal temperatures: e.g. those boiling below about 100 degrees F. are preferred, as such solvents are expelled from the deposit film without difficulty or complex equipment.

The solids content of the solution, that is, the constitution of the solvent-free coating upon the surface of the linear polymer, must include an ester such as diallyl phthalate in monomeric form to at least 18 percent by weight of the solids content of the adhesive mixture. This solids-content must also contain at least 20 percent by weight of a curable polyester resin, which may be selected from the polyesters employed in saturating resins for paper, cloth and glass fiber reinforcements: preferably the same resin is used for forming the core layers, but this is not essential so long as capability of interdiffusion and cohesion exists during curing. Illustrative of polyesters which can be used are ethylene glycol maleate, ethylene glycol phthalate maleate, and their homologs such as the propylene glycol esters, diethylene glycol esters, and other polyhydroxyl esters with alkylene substitution can be used. The remaining solids of the adhesive mixture are polyvinyl acetals, with at least 20 percent by weight thereof being used. Polyvinyl formal and polyvinyl butyral can be employed.

To maintain the solutions of adhesive materials in a usable form and to inhibit their "setting up," so that the material may be made up and used over a period of time without changing its characteristics for application, it has been found desirable to add inhibitors such as quinone (benzoquinone), tertiary butyral catechol and hydroquinone in amounts up to 0.05 percent. Where the mixture is to be consumed immediately, such inhibitor is not required.

A catalyst is employed in the mixture for activating it, such as benzoyl peroxide. The quantity added is based upon the probable storage time for the catalyzed mixture, and the economics of the heating or baking operation. It is preferred to employ about 2 percent by weight on the basis of the polymerizable elements in the adhesive mixture. When slower cures are permissible, the resin 1 percent or less is adequate. There is no advantage in employing more than 5 percent. With the lower percentages, the catalyzed solution of all ingredients can be made up in advance and, particularly with the presence of an inhibitor, can be stored for fairly long periods of time without gelling or change of consistency. For example, an adhesive solution with 0.05 percent quinone and 2 percent of benzoyl peroxide can be stored at 65 degrees F. for approximately three months; and will completely cure at 200 degrees F. in 45 minutes. With higher percentages of peroxide, the curing time can be reduced to 15 minutes at the same temperature, so that larger quantities of laminated product can be made in a given apparatus by the faster laminating speeds thus permitted: but correspondingly the storage life is reduced to a few weeks.

Examples of products manufactured by the process described above are as follows:

(1) An adhesive solution was prepared by dissolving 100 parts polyvinyl butyral, 150 parts diallyl phthalate and 150 parts by weight diethylene glycol maleate in 1000 parts by weight of ethylene dichloride with 6 parts by weight benzoyl peroxide added. This solution was applied to one side of each of two films of 0.0005" thick ethylene glycol terephthalate linear polymer. Simultaneously, a length of 0.006" thick 42 x 32 thread count woven glass fiber cloth was completely wet out with a benzoyl peroxide catalyzed solution of a flexible polyester resin formulation.

As soon as the solvent had evaporated from the adhesive which was applied to the linear polymer, the resin saturated glass cloth was encased between the two linear polymer sheets, with the adhesive layers inward, and the whole placed in a stretch frame, so as to hold the assembly flat, taut and wrinkle free. This assembly was then placed in an oven at 200 degrees F. for 45 minutes, after which it was removed from the oven, taken from the stretch frame, and trimmed to size. Examination revealed a transparent, strong, flexible, 0.008" thick product with strongly adherent surfaces having the characteristics of the linear polymer. This product exhibited the following electrical and physical properties:

Weight per square foot_____lb__ 0.088
Short time dielectric strength_____volts/mil__ 1700
Step-by-step dielectric strength_____volts/mil__ 1500

A corresponding laminate, made from the same saturating formulation and glass cloth, not sheathed with the linear polymer but formed between cellophane films which were stripped from the final product, showed typical dielectric strength values of 900 volts/mil short time, and 750 volts/mil step-by-step.

(2) An adhesive solution as in Example 1 above was continuously coated onto 0.0005" linear polymer films fed from two rolls, one above and one below a combining roll. Simultaneously, two plies of a 0.004" thick 60 x 58 thread count woven glass fiber cloth were led through a bath containing a peroxide catalyzed flexible polyester resin formulation and into the combining rolls. Positioning of rolls and rates of travel were such that the coated linear polymer films were solvent free as they contacted the impregnated fabrics and passed through the combining rolls with them in such a manner as to provide the external layers of the incipient laminate. After the momentary pressure of the combining rolls brought the assembly to a pre-determined, uniform thickness, the whole entered a tenter frame which seized the edges of the linear polymer (which was purposely wider than the glass cloth), stretched it taut, and proceeded to move the assembly through a series of ovens which surrounded the tenter. With oven temperatures graduated from 180 degrees F. to 300 degrees F., the assembly traveled at a speed proportional to total oven length (for example, 10 feet/minute through 130 feet of ovens). During passage through the ovens, polymerization took place both within the "core" of the laminate and at the adhesive surfaces. The cured product emerging from the end of the continuous laminator was trimmed along both edges, and then was either sheeted, wound into rolls, or slit and wound into coils, as desired. This laminate exhibited the following electrical and physical properties:

| | |
|---|---|
| Thickness _____ inch__ | 0.010 |
| Weight per square foot _____ lb__ | 0.083 |
| Short time dielectric strength _____ volts/mil__ | 1400 |
| Step-by-step dielectric strength _____ volts/mil__ | 1300 |
| Tensile strength, crosswise _____ p.s.i__ | 34,500 |
| Tensile strength, lengthwise _____ p.s.i__ | 47,200 |
| Dielectric constant, 1 megacycle _____ | 2.50 |
| Power factor, 1 megacycle _____ | 0.054 |
| Loss factor, 1 megacycle _____ | 0.13 |

An equivalent 0.010" thick laminate prepared between cellophane films and, therefore, without linear polymer surfaces would be comparably characterized by the following lesser properties:

| | |
|---|---|
| Short time dielectric strength _____ volts/mil__ | 900 |
| Step-by-step dielectric strength _____ volts/mil__ | 750 |
| Tensile strength, crosswise _____ p.s.i__ | 30,000 |
| Tensile strength, lengthwise _____ p.s.i__ | 33,000 |
| Dielectric constant, 1 megacycle _____ | 4.2 |
| Power factor, 1 megacycle _____ | 0.032 |
| Loss factor, 1 megacycle _____ | 0.13 |

(3) An adhesive solution was prepared by dissolving 100 parts polyvinyl formal, 75 parts monomeric diallyl phthalate, 225 parts ethylene glycol phthalate maleate and 6 parts BPO in a solvent mixture of 600 parts of toluol and 400 parts of ethyl alcohol. Following the procedure described in Example 2, this solution was applied to one side of each of two films of 0.001" linear polymer, which had been saturated with a catalyzed rigid polyester resin formulation, using the continuous laminating procedure previously described in Example 2. The cured and trimmed product resulting was either sheeted, wound into rolls, or slit and coiled, as desierd. This product had the following properties:

| | |
|---|---|
| Thickness _____ inch__ | 0.011 |
| Weight per square foot _____ lb__ | 0.095 |
| Short time dielectric strength _____ volts/mil__ | 1600 |
| Step-by-step dielectric strength _____ volts/mil__ | 1200 |
| Tensile strength, crosswise _____ p.s.i__ | 41,900 |
| Tensile strength, lengthwise _____ p.s.i__ | 51,600 |
| Dielectric constant, 1 megacycle _____ | 1.92 |
| Power factor, 1 megacycle _____ | 0.0025 |
| Loss factor, 1 megacycle _____ | 0.047 |

An equivalent 0.010" thick laminate perpared between cellophane films and, therefore, without linear polymer surfaces comparably exhibited the following lesser properties:

| | |
|---|---|
| Short time dielectric strength _____ volts/mil__ | 850 |
| Step-by-step dielectric strength _____ volts/mil__ | 650 |
| Tensile strength, crosswise _____ p.s.i__ | 35,500 |
| Tensile strength, lengthwise _____ p.s.i__ | 48,600 |
| Dielectric constant, 1 megacycle _____ | 3.6 |
| Power factor, 1 megacycle _____ | 0.0164 |
| Loss factor, 1 megacycle _____ | 0.059 |

(4) An adhesive solution as in Example 3 above was coated on one side of each of two films of 0.001" linear polymer which were used as the encasement for one ply of 0.015" bibulous kraft paper which had been saturated with a catalyzed flexible polyester resin, using the continuous laminating procedure previously described. The cured and trimmed product resulting had the following properties as compared with an equivalent product prepared from the same resin and paper, but between cellophane films:

| | Linear Polymer Sheathed Product | Cellophane Product |
|---|---|---|
| Thickness, inches | 0.016 | 0.015 |
| Weight per square foot, lb | 0.108 | 0.100 |
| Dielectric strength, short time, volts/mil | 1,400 | 900 |
| Weight loss—24 hours at 130° C., percent | 2.2 | 3.6 |
| Water absorption, 24 hrs. immersion, percent | 4.9 | 6.3 |

(5) An adhesive solution was prepared as in Example 1, except that ethyl alcohol was used as the solvent in lieu of ethylene dichloride, was coated on one side of each of two films of 0.001" linear polymer which were used as the encasement for four plies of glass fabric which had been saturated with a catalyzed fire-resistant polyester resin formulation. In this case, two of the plies of glass cloth were 0.022" in thickness and had a thread count of 28 x 14, while the other two were 0.029" thick and had a thread count of 42 x 36. The product laminated by the stretch frame technique exhibited the usual tenaciously adhered linear polymer faces, excellent self-extinguishing properties, extremely smooth and easily cleaned surface, a thickness of 0.125", and a weight of 1.193 lbs./sq. ft.

(6) An adhesive solution as in Example 5 above was coated on one side of 0.001" linear polymer film which was then used as the top encasing web in the continuous laminator. The bottom web, either linear polymer or cellophane, was not coated and, at the end of the run, was removed and discarded. The rigid resin saturated reinforcements in this case consisted of one ply of 0.020" cotton linters core paper and a smooth, decorated 0.008" alpha cellulose sheet which was run on top of the core, decorated side up, and in contact with the adhesive coated side of the linear polymer. The final product resembled in appearance the normal decorative reinforced polyester laminate with 0.002" to 0.003" of polyester resin overlay (for wear resistance), except that the linear polymer sheathed item had a superior surface sheen, without any "orange peel." This linear polymer sheathed decorative product had superior resistance to a wide range of chemicals. When a 400 degrees F. household iron was placed on this linear polymer surfaced laminate for a period of 5 minutes, no blistering, wrinkling, delamination or other indications of destruction were observed. Only a slightly perceptible yellowing revealed the position which the iron occupied. In wear resistance, the 0.001" linear polymer was found to protect the decorative surface beneath it against 450 double strokes of emery tape as applied by a standard reciprocating abrader. This compared to the protection equivalent to 350 double strokes provided by the standard 0.0025" polyester overlay, and the 300 double strokes protection afforded by the melamine surface on traditional high pressure laminates.

Another formulation of like properties can be prepared from:

| | Parts |
|---|---|
| Monomeric diallyl phthalate _____ | 143 |
| Polyvinyl formal _____ | 135 |
| Benzoyl peroxide _____ | 5.3 |
| Diethylene glycol maleate _____ | 173 |
| Ethylene chloride _____ | 1000 |

The diallyl phthalate of the above examples is illustrative of diallyl esters of dibasic organic acids, such as diallyl succinate and diallyl itaconate. Such materials are obtainable in monomeric form: and it will be understood that minor premature polymerization can be compensated by increasing the quantity employed to offset the portion thus no longer fully effective for establishing cross-linkages for the glycol maleate or other liquid polyester: and it is preferred to have the amount of diallyl compound in excess of that stoichiometrically sufficient for the intended cross-linking.

Catalysts other than benzoyl peroxide can be used in the formulations. In general, peroxides, hydroperoxides, and perbenzoates can be employed to activate the polyester polymerization by a free radicle mechanism: these usually exist in an equilibrium state with the respective free-radicle form, the percentage present in the free-radicle form increasing with increases in temperature. Thus, the free-radicle concentration for one per-compound at a relatively low temperature may be sufficient to initiate rapid polymerization, while another per-compound will require a relatively higher temperature for the same effect. For example, methyl ethyl ketone peroxide will effect a cure at 100 degrees F., and can be used where the compound can be held well below this temperature before use; noting that an even lower temperature of curing can be attained by adding to the methyl ethyl ketone peroxide a trace of cobalt ion. Such compositions, however, have virtually no "pot life" at room temperature, and hence must be used at once. On the other hand, tertiary butyl perbenzoate requires a temperature above 300 degrees F. for effecting a cure at a corresponding rate: and therewith confers a greatly extended "pot life" and permits extended storage without deleterious premature curing. Accordingly, the selection of a suitable per-compound as the catalyst depends upon the intended practice including the factors of "pot life," the storage facilities, the behavior of the selected core saturants, reinforcements and other components at the intended curing temperature, the oven equipment to be used, available oven temperatures, economic speeds of operation, etc. For example, when styrene is employed as a component of the saturant for the core or body, its volatility compels a compromise between extreme conditions, and benzoyl peroxide has been employed in such illustrative examples: another per-compound having a similar free-radicle formation condition at the same temperatures as the benzoyl peroxide can be directly substituted. More active catalysts, that is, those having a higher free-radicle concentration, may then give trouble as by uneconomical employment of the equipment at such temperatures. Conversely, more stable catalysts, with lower relative free-radicle concentrations than benzoyl peroxide at the selected temperatures, demand a slower cure throughout, or at least until the core or body saturant has gelled, with a subsequent use of higher temperatures to complete the cure with a given oven equipment. The more stable catalysts are valuable where the coating is to be applied upon the linear polymer surfacing layer, and this material wound up and stored prior to use; wherewith the long shelf life of such formulations permits the storage, and a coordinated selection of the core or body formulation and the heating schedule permits the use of the higher temperatures required to effect a cure in an economical time.

The temperature schedule for the curing depends upon the catalyst selected, and also upon the timing of the several steps. Illustratively, when a "wet lay-up" is being employed, and the saturated core or body layers contain monomeric styrene or like component, the initial temperatures should not exceed about 200 degrees F. until the "body resin" has gelled: thereafter higher temperatures can be employed. For example, with the specific formulations stated, the initial oven chambers can be set at 180 degrees F. and the final oven chamber at 300 degrees F., with intermediate chambers at successively and uniformly higher temperatures. It is preferred to observe a maximum of 350 degrees F. with the above examples, to minimize yellowing discoloration of the glue line.

The temperature schedule is also dependent upon the concentration of the catalyst, noting that with increased proportions of catalyst, more free radicles are present relative to the quantity of mixture to be cured: thus, with an increased concentration of catalyst, the "body polyester" gels more rapidly, and therefore the increase of temperatures for later oven chambers may be more abrupt, and a greater number of terminal oven chambers may be set at 300 degrees F., for example, for a given oven length and a given general formulation. Further, with such increase of concentration, a unit length of laminate moving in a continuous oven operation will absorb the necessary energy for completing its cure in a shorter time; and thus the oven conveyor system may be operated at a faster rate.

It will be understood that where a decorated laminate product is desired, the surface film or films of linear polyester polymer may be transparent, and decoration provided by adding coloring matter such as pigments to portions of the adhesive, and applying the adhesive in two or more operations, so that the desired colored pattern is produced: wherewith the bonding of the surface film or films is accomplished by colored adhesive in patterned form, with this pattern being thereafter protected by the resistance of the surfacing film material itself.

It will be understood that the illustrative examples are not restrictive, and that the invention may be practiced in many ways within the scope of the appended claims.

What is claimed is:

1. The method of preparing a laminated structure having a surface layer of linear polymeric ethylene glycol terephthalate which comprises coating a surface of a sheet of the said linear polymeric material with a bonding composition consisting as components of at least 20 percent by weight of liquid polyester with alkylene substitution, at least 18 percent by weight of monomeric diallyl ester of a dibasic organic acid, and at least 20 percent by weight of polyvinyl acetal, together with a catalyst consisting of a per-compound effective for polymerizing the composition and selected from the group consisting of peroxides, hydroperoxides and perbenzoates, in a volatile solvent for the said components; exposing the coating at a temperature for volatilization of the solvent, applying the coated surface of the said linear polymeric material to core lamination material including reinforcing material and having a saturant in and on said reinforcing material of a curable liquid polyester composition with said coating composition in contact with the core material, and heating for effecting concurrent curing of said bonding composition and said polyester composition and thereby effecting adhesion of the surface layer to the cured core lamination material.

2. The method as in claim 1, in which the liquid polyester is ethylene glycol phthalate maleate, the monomeric diallyl ester is diallyl phthalate, the polyvinyl acetal is polyvinyl formal, and the catalyst is benzoyl peroxide.

3. The method as in claim 1, in which the liquid polyester is diethylene glycol maleate, the monomeric diallyl ester is diallyl phthalate, the polyvinyl acetal is polyvinyl butyral and the catalyst is benzoyl peroxide.

4. The method as in claim 1, in which the liquid polyester is ethylene glycol phthalate maleate.

5. A laminated material including a surface layer of linear polymeric ethylene glycol terephthalate, made by the process of claim 1.

References Cited in the file of this patent

UNITED STATES PATENTS

| | | |
|---|---|---|
| 2,465,319 | Whinfield et al. | Mar. 22, 1949 |
| 2,528,235 | Loritsch | Oct. 31, 1950 |
| 2,673,826 | Ness | Mar. 30, 1954 |
| 2,765,250 | Williams | Oct. 2, 1956 |